(12) United States Patent
Correns et al.

(10) Patent No.: US 8,499,537 B2
(45) Date of Patent: Aug. 6, 2013

(54) ARRANGEMENT FOR FILLING A CONTAINER WITH BULK MATERIAL

(75) Inventors: Nico Correns, Weimar (DE); Christoph Nieten, Jena (DE); Michael Rode, Jena (DE)

(73) Assignee: Carl Zeiss Microscopy GmbH (DE)

( * ) Notice: Subject to any disclaimer, the term of this patent is extended or adjusted under 35 U.S.C. 154(b) by 904 days.

(21) Appl. No.: 12/518,394

(22) PCT Filed: Feb. 21, 2008

(86) PCT No.: PCT/EP2008/001351
§ 371 (c)(1),
(2), (4) Date: Dec. 2, 2009

(87) PCT Pub. No.: WO2008/101694
PCT Pub. Date: Aug. 28, 2008

(65) Prior Publication Data
US 2010/0108188 A1    May 6, 2010

(30) Foreign Application Priority Data
Feb. 22, 2007  (DE) .......................... 10 2007 009 666

(51) Int. Cl.
*B65G 67/22*   (2006.01)
*B65G 69/04*   (2006.01)

(52) U.S. Cl.
USPC .............. 56/10.2 E; 141/95; 141/98; 141/231

(58) Field of Classification Search
USPC ....................... 141/94, 95, 98, 231; 56/10.2 E
See application file for complete search history.

(56) References Cited

U.S. PATENT DOCUMENTS

| | | | |
|---|---|---|---|
| 3,889,796 A * | 6/1975 | Baily et al. ..................... | 198/301 |
| 4,376,609 A | 3/1983 | Bohman et al. | |
| 5,359,838 A | 11/1994 | Madsen | |
| 5,575,316 A * | 11/1996 | Pollklas ........................ | 141/231 |

(Continued)

FOREIGN PATENT DOCUMENTS

| DE | 31 12 826 | 2/1982 |
|---|---|---|
| DE | 42 40 094 | 6/1994 |

(Continued)

OTHER PUBLICATIONS

Translation of the International Preliminary Report on Patentability, for the corresponding PCT Application No. PCT/EP2008/001351, dated Sep. 8, 2009.

*Primary Examiner* — Gregory Huson
*Assistant Examiner* — Nicolas A Arnett
(74) *Attorney, Agent, or Firm* — Fish & Richardson P.C.

(57) ABSTRACT

The invention relates to an arrangement for filling a container (5) with bulk material (3), comprising a filling device with an outflow opening (6) for the bulk material (3) and a container (5) with a filling opening, through which the bulk material (3) passes into the container (5). According to the invention, an arrangement of the abovementioned type is equipped with a measuring device (13) for the repeated detection of image data from the surface (7) of the bulk material (3) in the container (5) during filling and for the repeated determination of filling state values h which are equivalent to the level of the filled bulk material in predefined regions of the bulk material surface, and with a signal processing device for generating control commands from the filling state values h for positioning the outflow opening (6) and the filling opening relative to one another and/or for influencing the quantity of bulk material (3) which flows out of the outflow opening (6) per unit time.

20 Claims, 2 Drawing Sheets

U.S. PATENT DOCUMENTS

Figure 3:
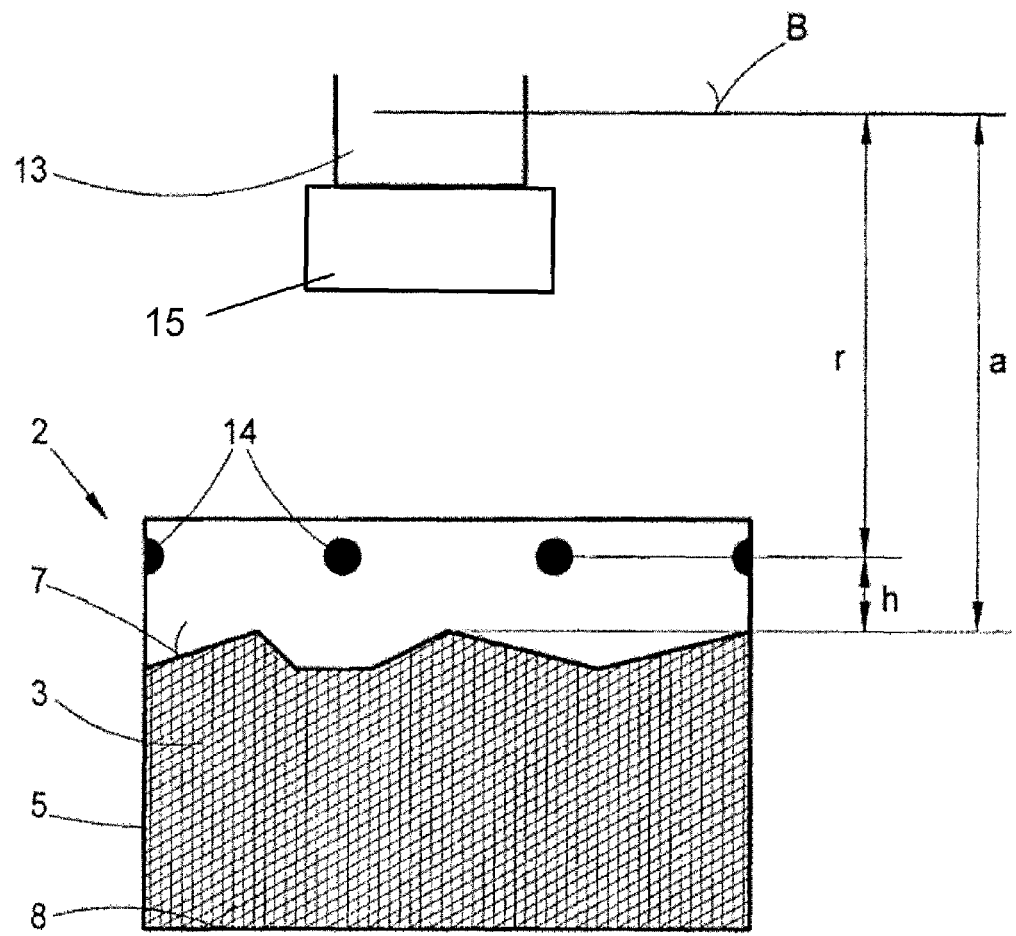

| | | | |
|---|---|---|---|
| 5,749,783 A * | 5/1998 | Pollklas | 56/10.2 D |
| 6,097,425 A | 8/2000 | Behnke et al. | |
| 6,587,772 B2 * | 7/2003 | Behnke | 701/50 |
| 6,682,416 B2 * | 1/2004 | Behnke et al. | 141/231 |
| 6,943,824 B2 * | 9/2005 | Alexia et al. | 348/89 |
| 7,677,169 B2 * | 3/2010 | Covington et al. | 56/10.2 R |
| 2011/0061762 A1 * | 3/2011 | Madsen et al. | 141/1 |

FOREIGN PATENT DOCUMENTS

| | | |
|---|---|---|
| DE | 43 39 441 | 5/1995 |
| DE | 44 03 893 | 8/1995 |
| DE | 44 26 059 | 2/1996 |
| DE | 195 31 662 | 3/1997 |
| DE | 196 47 522 | 5/1998 |
| DE | 199 47 739 | 4/2001 |
| DE | 100 64 862 | 7/2002 |
| DE | 10 2005 011 778 | 9/2006 |
| EP | 0 666 018 | 8/1995 |
| EP | 0 760 202 | 3/1997 |
| EP | 1 219 153 | 7/2002 |
| EP | 1 529 428 | 10/2004 |

* cited by examiner

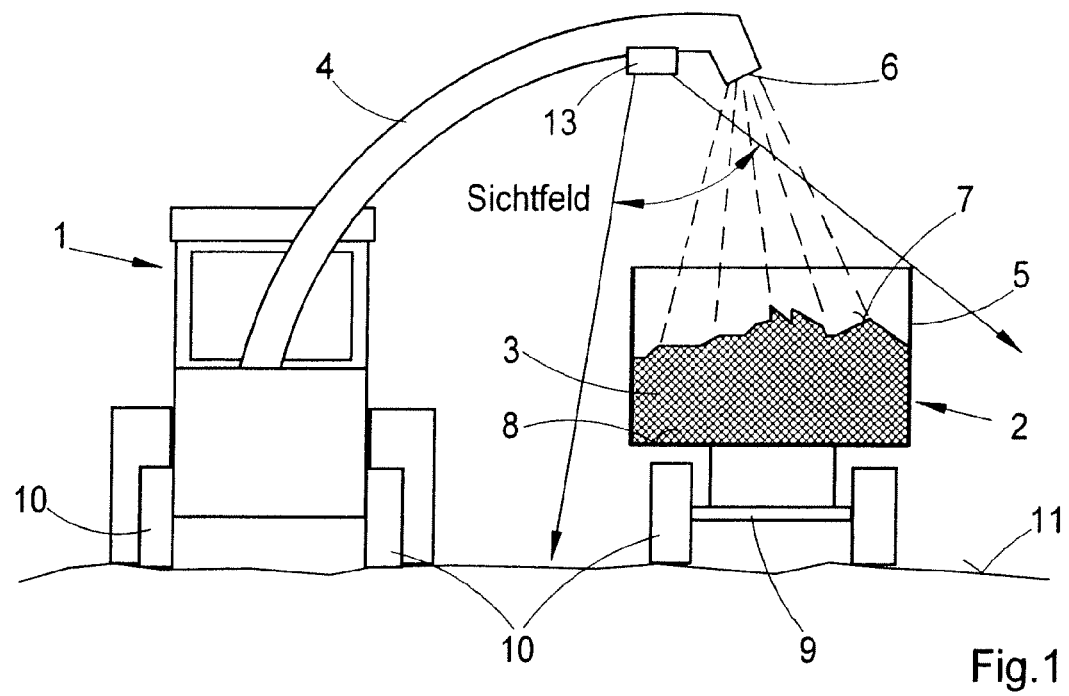
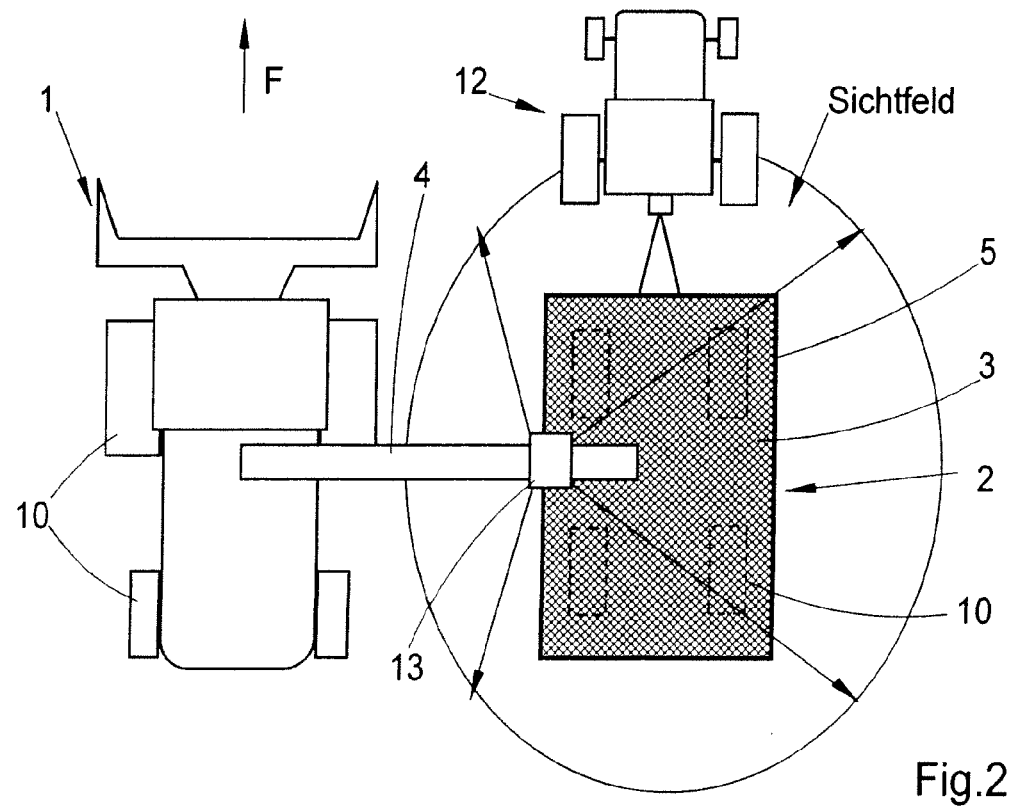

ARRANGEMENT FOR FILLING A CONTAINER WITH BULK MATERIAL

This application is a National Phase application under 35 U.S.C. §371 filed from International Patent Application Serial No. PCT/EP2008/001351, filed on Feb. 21, 2008, which claims priority to German Patent Application Serial No. 10 2007 009 666.8, filed on Feb. 22, 2007.

SUBJECT MATTER OF THE INVENTION

The invention relates to an arrangement for filling a container with bulk material, comprising a filling device with an outflow opening for the bulk material and a container with a fill opening through which the bulk material enters the container.

The invention is advantageous for applications related to agricultural harvesting machinery, such as combines and field choppers, and the transport vehicles associated with such harvesting machinery for the storage and transport of the material to be harvested. In particular, [it is advantageous] for the control of automatic loading processes of the container on the transport vehicle. However, the applications are not limited to such applications.

STATE OF THE ARTS

It is known, for example, to fill the grain during grain harvest first into a tank incorporated in the harvesting machinery, in this instance a combine. However, given that this tank has only a limited capacity, repeated emptying of this tank will be required during the harvesting process. During the emptying process, the grain is moved through an outlet chute and from there into a trailer being pulled by a propulsion vehicle in a parallel direction to the direction of travel of the combine.

In order to save time, the trailer will be filled during the harvesting process, i.e. both the combine and the propulsion vehicle with its trailer are moving across the grain field. During the process, either the driver of the propulsion vehicle or the driver of the combine must monitor the filling of the trailer. The monitoring must take care to assure that the transfer from the combine into the trailer occasions no losses to the extent possible
in order to avoid losses in output and that the loading capacity of the trailer is used optimally, where the load must be distributed with regard to the pre-specified maximum axle load, while for efficiency reasons neither less nor more than the permissible load is loaded.

Normally, it is impossible to adjust either the height of the opening of the outflow chute, from which the grain flows into the trailer, or the azimuth angle of the outflow chute, which determines the position of the outlet above the trailer, from the combine, such that the control of the propulsion vehicle will need to assure that the outlet is in a position above the trailer that is desirable for optimal loading.

Similar problems apply to harvesting with field choppers. However, in this case, the material to be harvested is not stored initially within the harvesting machinery, but will be directed through an outflow chute into the container of a transport vehicle, where the transport vehicle, which may again be a trailer being pulled by a propulsion vehicle, moves across the field next to the field chopper. Moreover, it is feasible here to adjust the outflow chute with regard to height, azimuth and length of throw.

U.S. Pat. No. 5,359,838, for example, describes an arrangement for the automatic control of an outflow chute that is a component of an agricultural harvesting machine. The position of a field chopper is held constant relative to a trailer by means of a linkage device, which thus also holds the position of the outflow chute on the field chopper constant relative to the loading area of the trailer. The disadvantage here is that the trailer must be pulled by the field chopper; in addition, there is first the time required to hitch the trailer to the field chopper, then the unhitching after the trailer has been filled, and finally the hitching of another empty trailer, all of which results in undesirable time losses.

The process described in DE 100 64 862 A1 synchronizes the direction of travel and speed of travel of harvesting machinery and a propulsion vehicle with a trailer to each other, where at least one of the vehicles, either the harvesting machinery or the propulsion vehicle pulling the trailer, is equipped with a navigation device and there is an exchange of position data between the vehicles. Even though this process permits the monitoring of the relative positions of harvesting machinery and propulsion vehicle and by implication also a control of the outflow chute, automatic monitoring and control of the filling process of the trailer that is independent of the subjective evaluation of the driver of the harvesting machinery or of the driver of the propulsion vehicle is likewise not feasible.

DE 3 112 826 A1 describes an arrangement where the harvesting machinery is designed with an optical system to monitor reflecting marks on the trailer. Control of the outflow chute relative to the trailer depends on the signal captured by the optical system. Given the criteria described in detail above, this arrangement also does not yield an optimal loading pattern.

Furthermore, DE 196 47 522 A1 proposes to use an optoelectronic camera to monitor the filling process. However, even though the camera produces a visual image of the loading area, which is sent to the driver of the harvesting machinery and/or the driver of the propulsion vehicle by way of a monitor, there is likewise no automatic control of the outflow chute relative to the trailer that is independent of subjective factors.

Likewise, the process described in DE 44 26 059 A1 proposes to use a camera. The camera is mounted here on the outflow chute and serves to monitor the outflow opening of the outflow chute as well as the loading area of the trailer to be filled, such that manual adjustments of the position of the harvesting machinery relative to the trailer and a manual monitoring of the filling process can be handled based on the image data.

DESCRIPTION OF THE INVENTION

Based on the state of the arts, the invention has the objective of creating an arrangement as described above that yields an optimal filling of a container with bulk material and avoids losses of bulk material with a maximum exclusion of subjective influences.

The invention solves this objective by an arrangement for the filling of a container with bulk material of the type described above that includes
   a measurement device
      for the periodic capture of images data of the surface of the bulk material during the filling process and
      for the periodic determination of fill values h, which are equivalent to the height of the filled bulk material in pre-specified segments of the surface of the bulk material, as well as
   with a signal processing device to generate control commands from fill values h to position the outflow opening and the fill opening relative to each other and/or to modify the quantity of bulk material emanating from the outflow opening in a given time period.

In contrast to the previously known solutions, the arrangement of the invention generates a three-dimensional image of the surface of the bulk material, but at a minimum of selected and thus pre-specified segments of the surface of the bulk material, from the image data in connection with the fill values h. The filling process is controlled on the basis of these three-dimensional image data independently of subjective influences.

In order to optimize the filling process automatically, the signal processing device links the image data and fill values h, generates control commands from the linkage and uses the latter to position the outflow opening relative to the fill opening, to position the fill opening relative to the outflow opening and/or to modify the quantity of bulk material emanating from the outflow opening in a given time period.

In other words: If the analysis of the images data and the fill values h or the three-dimensional image of the bulk material surface derived from them indicate that the container is not filled optimally, for example to the extent that the bulk material surface is uneven in an undesirable manner due to cones of bulk material, then control commands are issued to modify the position of the outflow opening relative to those surface areas where the bulk material has not yet reached the intended height, in order to fill those areas.

In addition or alternatively, the linkage of image data and fill values h is designed to issue control commands to supply more bulk material to those surface segments where the bulk material has not yet reached the permitted fill height.

This method permits an optimal filling process, both in terms of the amount filled into the container and in terms of the time required, while also avoiding losses of bulk material due to filling errors.

The image data may be captured by means of single optical sensors, lines of optical sensors and/or arrays of optical sensors. Such optical sensors and their use are sufficiently known from the state of the arts that a detailed explanation is not required here.

The fill values h are determined by a distance measuring device that repeatedly monitors the distances a between a reference level B above the container to be filled and the specified segments of the surface of the bulk material, with a computation to determine the fill values h from the measured distances a.

These means facilitate a determination and continuous monitoring of the fill height, in each case relative to the specified surface segments during the filling process.

A preferred embodiment of the arrangement of the invention uses phase-sensitive sensors in the distance measuring device, with a particularly preferred embodiment with one or more arrays of phase-sensitive sensors, capable of capturing the image data as well as the distances a by the well known "time-of-flight" approach.

In addition to measuring brightness, phase-sensitive sensors also measure the time-of-flight of the light transmitting the image data and thus facilitate the measurement of distances, thus distances a in the present case. This process uses a separate and modulated light source to illuminate the objects for which the distance is to be measured, thus to illuminate the specified segments of the surface of the bulk material.

It is advantageous to define reference level B as the receiving surface of the phase-sensitive sensors integrated into the measurement device. The measurement device may be adjacent to the outflow opening, for example.

In order to compare the distances a measured during the filling process against the maximum fill values h, there is at least one measurement marking on the container, where the distance between reference level B and the measurement marking corresponds to reference height r.

The measurement markings may be embodied as the upper edges of the sides of a trailer receiving the bulk material, markings at the maximum fill height on the inside or the outside of the side of the trailer or markings outside the trailer at the level of the container floor or the floor of the loading area.

The relevant surface areas may be defined as surface areas distributed in various distances from each other on the surface of the bulk material, but preferably equally spaced geometrically.

A particularly preferable embodiment of the arrangement of the invention adds cylindrical lenses, prisms or free-form planes upstream of the array of phase-sensitive sensors in order to obtain an unequal distribution of the optical resolution in the capture of image and distance data. It is advantageous here that the pre-specified surface areas used for the generation of control commands are surveyed with a higher resolution than the other surface areas less of interest to the intent of the invention.

In most applications, the fill opening of the container is several times larger than the outflow opening of the outflow chute, where the outflow chute is linked to a controllable motor. In the invention, this motor is linked to the signal processing device, such that transmission of a signal to this motor from a control command generated in the signal processing device can modify the position of the outflow opening relative to the fill opening.

Optionally, the system may also be designed such that the outflow chute with the outflow opening is a component of a transportation device for the bulk material that has a control device to modify the quantity being moved, where this control device is linked to the signal processing device and where this link is designed to transmit control commands to modify the quantity of bulk material ejected from the outflow opening in a given time period.

In this process, the modification of the quantity of bulk material ejected from the outflow opening in a given time period is a function of the fill values h, such that faster filling of the bulk material is achieved, whenever the intended fill height has not yet been reached. Or the corollary: The quantity of bulk material ejected for specific surface segments is reduced and eventually set to Zero, where the intended fill height has been achieved.

The arrangement of the invention is particularly advantageous for use with agricultural harvesting machinery, such as field choppers or combines, where the container to be filled is a component of a transport vehicle that serves to receive and transport the material to be harvested.

In the application for a field chopper, the control commands are generated such that the outflow opening will always be moved into such a position relative to the trailer that filling may proceed for surface segments, where the desired fill height has not yet been achieved.

When harvesting with a combine that does not have an adjustable outflow chute, control commands are issued for transfer to the propulsion vehicle in order to position the propulsion vehicle relative to the outflow opening such that the outflow opening is always maintained in a position relative to the trailer that assures filling for the surface segments that have not yet reached the desired fill height.

If the outflow opening has an adjustable device that facilitates the throw distance of the bulk material, the invention provides also for the generation of suitable control commands that would also achieve an optimal filling process relative to its duration and avoidance of losses of bulk material.

SHORT DESCRIPTION OF THE DRAWINGS

The invention will be described in the following in more detail by reference to an embodiment of the invention for harvesting machinery. The relevant drawings show:

FIG. 1 a schematic diagram of the arrangement of the invention in a side view

FIG. 2 the schematic diagram of FIG. 1 in a top view,

FIG. 3 a detail of FIG. 1

DETAILED DESCRIPTION OF THE DRAWINGS

FIG. 1 shows a schematic of: Harvesting machinery 1, for example a field chopper, and trailer 2 intended to receive and transport the harvested material as bulk material 3.

During the harvesting process, bulk material 3 moves through outflow chute 4 into container 5, i.e. the load container of trailer 2. In this process, bulk material 3 flows through outflow opening 6 in outflow chute 4 into container 5.

In the harvesting process of the state of the arts, bulk material 3 aggregating in container 5 forms an uneven surface 7, as is shown in FIG. 1, for example. The lack of even distribution derives from the unequal filling over surface 7, as well as by naturally resulting fill cones or the angle of repose characteristic for the bulk material.

As a result, trailer 2 is not optimally loaded to the extent that there are differences in fill height between surface segments, where the fill height may be less than the available load capacity in some segments. Moreover, the distribution of the load relative to axle 9 is also more or less accidental.

As FIG. 1 and FIG. 2 indicate, harvesting machinery 1 and trailer 2 drive across harvested field 11 on wheels 10.

FIG. 2 shows the arrangement of FIG. 1 in a top view. It is obvious here that propulsion vehicle 12 is placed ahead of trailer 2 in order to move trailer 2 in a parallel direction to the direction of movement F of harvesting machinery 1.

FIG. 1 and also FIG. 2 show a measurement device 13 on outflow chute 4 that will optimize the filling process for trailer 2. Measurement device 13 consists essentially of a "time-of-flight" camera with an array of phase-sensitive sensors to capture image data as well as distance data, as described above.

In addition, there is a signal processing device that is not shown in the drawing, but which may be housed within measurement device 13 or alternatively within harvesting machinery 1, and which serves to generate control commands regarding the positioning of outflow opening 6 relative to trailer 2.

The control commands are first generated on the basis of the image data of surface 7 of bulk material 3 captured by the phase-sensitive sensors with the pre-specified frequency and also on the basis of the determination of fill values h associated with the pre-specified surface segments of bulk material 3 obtained with the same frequency, as described below with reference to FIG. 3.

First, it must be pointed out that in the embodiment of the arrangement of the invention chosen as the example with a field chopper, outflow chute 4 is linked with adjustable motors (not shown in the drawing), which can modify:

the position of outflow opening 6 above trailer 2 by an azimuth rotation, the height of outflow opening 6 above trailer 2 by raising or lowering outflow chute 4, and/or the throw distance of the material being harvested, where the signal processing device is linked to these motors to transmit control commands to them, Then, there is a transportation device, which is also not shown in the drawing and which propels bulk material 3 through outflow chute 4 to outflow opening 6, from where bulk material 3 enters container 2.

FIG. 3 includes a reference level B. It may be assumed that the receiving surfaces of the phase-sensitive sensors are on this reference level B. This is accomplished when measurement device 13 is attached at the corresponding height on outflow chute 4, or alternatively, when there is a separate holder for measurement device 13 that fixes the receiving surfaces of the phase-sensitive sensors on reference level B.

Reference level B is at a reference height r above trailer 2. Reference height r is defined by the distance between reference level B and measurement markings 14.

Measurement markers 14 are attached to the interior surface of the side walls of trailer 2 at a pre-specified distance from the upper edge of the side wall. There must be at least one measurement marking 14, but there may be several. For example, three measurement markings 14 suffice to define a plane for the optimal fill height. This fill height must be specified separately for each trailer 2 used during the harvesting process.

This type of measurement markings and their positioning are shown here only by way of example. It is also feasible that measurement markings could be used comparably, where such markers are mounted at the height of the maximum fill height on the exterior surface of the side walls of trailer 2, on the upper edges of the side walls of trailer 2 or on the exterior surface of the side walls of trailer 2 at the level of the container floor, where this list is not complete.

During the operation of the arrangement of the invention, the phase-sensitive sensors measure the distances a between reference level B and the surface 7 and the reference height r between reference level B and the markings, in addition to capturing the image data for surface 7, in short intervals specified by a timer.

To this end, the array of phase-sensitive sensors in measurement device 13 is dimensioned such that images are derived for the complete loading area of trailer 2 and thus the complete surface 7 of bulk material 3 as well as the side walls with measurement markings 14. As shown in FIG. 3, cylindrical lens, prisms, or free-form planes 15 may be positioned upstream of the phase-sensitive sensors.

The measurement results are updated continually on the basis of the measurements repeated in short intervals, which thus provides a current three-dimensional image of the space seen by measurement device 13 at all times by use of the image processing device.

The signal processing device includes a computation circuit designed to determine the fill values h based on the equation $h = a - r$. Thus, the signal processing device always has the current fill values h associated with various segments of surface 7.

This process provides the image and distance data required to generate the intended control commands. The control commands control the motors such that the fill values h are continually reduced during the harvesting process, until the optimal filling status is reached at $h = 0$ for all monitored surface segments.

An improved embodiment is designed to use the signal processing device to monitor changes in the position of trailer 2 relative to transport vehicle 1 from the information captured for surface 7, for example by way of period comparisons of image to image, and thus to derive correction commands for propulsion vehicle 12 or the driver of propulsion vehicle 12.

This makes it possible for the present embodiment example of a field chopper to position an empty trailer as a replacement for a just filled trailer 2 without having to stop harvesting machinery 1. This can be achieved, if measurement device 13 is designed such that it monitors not only the image and distance data for trailer 2 or its load area, but in addition data for at least one additional trailer that is not yet filled and that is being pulled next to, in front of or behind the just filled trailer 2.

In this instance, the signal processing device should be designed to generate control commands and/or instructions to the driver of propulsion vehicle 12 that is linked to the additional trailer. That approach would facilitate a substitution of trailers 2 combined with proper positioning of outflow opening 6 during the substitution with minimal losses of harvested material.

So far, the arrangement of the invention has been explained for a use with a field chopper. As stated above, there are peculiarities for a use with combines, such that neither the height of the outflow opening 6 on outflow chute 4, through which the grain flows into trailer 2, nor the azimuth position of outflow chute 4, which determines the position of outflow opening 6 relative to trailer 2, can be adjusted during the filling process.

In this instance, it is feasible to derive corrections to the control commands for the steering device and the acceleration/deceleration device of propulsion vehicle 12 from the image and distance data obtained, to transfer these to propulsion vehicle 12, and to adjust the direction and speed of travel of propulsion vehicle 12 such that outflow opening 6 will always be in a position above trailer 2 that is desirable for optimal fills.

An improved embodiment of the invention could include a volume estimation of the harvested material, for example, which would be significantly more precise than merely the number of filled trailers. This would merely require that the signal processing device is embodied such the image and distance data could determine the volume of the space in each trailer 2 that is reserved for filling. Given that use of the arrangement of the invention will assure that trailers 2 are loaded optimally, the sum of the volume of these spaces will yield the volume of harvested material with a high degree of precision.

In addition, if one were to assume an average specific density for the bulk material in question, the weight could be derived from the volume obtained as described above.

LIST OF REFERENCE NUMBERS

1 Harvesting machinery
2 Trailer
3 Bulk material
4 Outflow chute
5 Container
6 Outflow opening
7 Surface
8 Container top
9 Axle
10 Wheels
11 Field to be harvested
12 Propulsion vehicle
13 Measurement device
14 Measurement markings
B Reference level
r Reference height
a Distance
h Fill value
F Direction of travel

The invention claimed is:

1. An arrangement, comprising:
a filling device with an outflow opening for a bulk material,
a container with a fill opening through which the bulk material can move into the container,
a measurement device configured to capture image data of a surface of the bulk material in the container as the bulk material moves into the container, and the measurement device configured to determine height values which represent heights of the bulk material in the container in pre-specified segments of the surface of the bulk material, and
a signal processing device configured to determine a three-dimensional image of at least the pre-specified segments of the surface of the bulk material based on the captured image data and the determined height values, the signal processing device also being configured to generate control commands based on the determined three-dimensional image to position an outflow opening and the fill opening relative to each other and/or configured to modify a quantity of the bulk material ejected by the outflow opening during a given time period.

2. The arrangement of claim 1, wherein the measurement device comprises individual optical sensors, lines of optical sensors and/or arrays of optical sensors designed to capture image data.

3. The arrangement of claim 1, further comprising computation circuit downstream from the measurement device;
wherein:
the measurement device is configured to repeatedly measure distances between a reference level and the pre-specified segments of the surface of the bulk material, and
the computation circuit is configured to compute the height values based on the measured distances.

4. The arrangement of claim 3, wherein the measurement device comprises phase-sensitive sensors designed to measure distances.

5. The arrangement of claim 4, wherein the reference level is defined by a position of the receiving surfaces of the phase-sensitive sensors.

6. The arrangement of claim 5, wherein the phase-sensitive sensors are an integral component of the measurement device.

7. The arrangement of claim 6, wherein the measurement device is attached to the outflow opening.

8. The arrangement of claim 3, wherein the measurement device comprises an array of phase-sensitive sensors to capture the image data and simultaneously measure distances.

9. The arrangement of claim 8, further comprising cylindrical lenses, prisms or free-form planes upstream of the phase-sensitive sensors to generate an unequally distributed optical resolution in the capture of image data, wherein a higher resolution is intended for image data of the pre-specified surface segments than for the image data of the other surface segments.

10. The arrangement of claim 3, wherein surface segments are specified for monitoring that are distributed with roughly equal geometrical spacing from each other across the entire surface of the bulk material.

11. The arrangement of claim 1, wherein:
a size of the fill opening is greater than a size of the outflow opening, the outflow opening is linked to a controllable motor to modify its position above the fill opening, and the signal processing device is linked to the motor for the transmission of control commands regarding the positioning of the outflow opening relative to the fill opening.

12. The arrangement of claim 11, where the positioning of the outflow opening is adjusted based on the height values.

13. The arrangement of claim 1, wherein:

the outflow opening is a component of a transportation device for bulk material, the transportation device is equipped with a motor control to modify the amount being transported, and the signal processing device is connected to the motor control in order to transmit commands to modify the amount of the bulk material being ejected from the outflow opening during a given time period.

14. The arrangement of claim 13, where the change in the amount of the bulk material being ejected from the outflow opening during a given time period depends on the height values.

15. The arrangement of claim 1, wherein the outflow opening is a component of agricultural harvesting machinery, and the container is a component of a transport vehicle designed to receive and transport harvested material as bulk material.

16. The arrangement of claim 1, wherein the signal processing device includes a computation circuit to determine a volume in a trailer intended to be filled with the bulk material and to determine a volume of the bulk material loaded on an optimally loaded trailer.

17. The arrangement of claim 16, wherein the signal processing device includes a computation circuit to determine the weight of the bulk material loaded on the trailer based on the volume and the specific density pre-specified for the bulk material in question.

18. The arrangement of claim 1, wherein the measurement device is configured to periodically capture image data of the surface of the bulk material in the container as the bulk material moves into the container, and the measurement device is configured to periodically determine height values which represent heights of the bulk material in the container in pre-specified segments of the surface of the bulk material.

19. The arrangement of claim 1, wherein the measurement device is configured to capture image data of an entire surface of the bulk material in the container as the bulk material moves into the container.

20. The arrangement of claim 1, wherein the measurement device is configured to capture image data of less than an entire surface of the bulk material in the container as the bulk material moves into the container.

* * * * *